United States Patent
Douskey et al.

(10) Patent No.: US 9,032,256 B2
(45) Date of Patent: May 12, 2015

(54) MULTI-CORE PROCESSOR COMPARISON ENCODING

(71) Applicant: International Business Machines Corporation, Armonk, NY (US)

(72) Inventors: Steven M. Douskey, Rochester, MN (US); Ryan A. Fitch, Southfield, MI (US); Michael J. Hamilton, Rochester, MN (US); Dennis M. Rickert, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 13/739,727

(22) Filed: Jan. 11, 2013

(65) Prior Publication Data
US 2014/0201575 A1 Jul. 17, 2014

(51) Int. Cl.
*G06F 11/00* (2006.01)
*G06F 11/273* (2006.01)
*G06F 11/22* (2006.01)

(52) U.S. Cl.
CPC .......... *G06F 11/273* (2013.01); *G06F 11/2242* (2013.01)

(58) Field of Classification Search
CPC ............ G06F 11/1629; G06F 11/1633; G06F 11/1641; G06F 11/18; G06F 11/182; G06F 11/183; G06F 11/184; G06F 11/187; G06F 11/2236; G06F 11/263; G06F 11/273
USPC .......... 714/11, 37, 45, 724, 732, 738
See application file for complete search history.

(56) References Cited

U.S. PATENT DOCUMENTS

| | | | |
|---|---|---|---|
| 6,560,734 B1 * | 5/2003 | Whetsel | 714/724 |
| 7,610,537 B2 | 10/2009 | Dickinson et al. | |
| 7,613,966 B2 | 11/2009 | Edgar et al. | |
| 7,673,208 B2 * | 3/2010 | Seuring | 714/736 |
| 7,689,884 B2 * | 3/2010 | Seuring | 714/729 |
| 7,702,976 B2 | 4/2010 | Gorman et al. | |
| 7,788,562 B2 * | 8/2010 | Brennan et al. | 714/732 |
| 7,900,086 B2 | 3/2011 | Datta et al. | |
| 8,065,576 B2 | 11/2011 | Miner et al. | |
| 8,127,192 B2 | 2/2012 | Arora et al. | |
| 8,136,001 B2 | 3/2012 | Xu et al. | |
| 8,607,109 B2 * | 12/2013 | Whetsel | 714/729 |
| 8,769,360 B2 * | 7/2014 | Motika et al. | 714/733 |
| 2009/0089636 A1 * | 4/2009 | Fernsler et al. | 714/728 |
| 2011/0231616 A1 * | 9/2011 | Lin | 711/147 |
| 2011/0271161 A1 * | 11/2011 | Kursun et al. | 714/736 |

(Continued)

OTHER PUBLICATIONS

Chun-Chuan CI et al., "A Low-Cost and Scalable Test Architecture for Multi-Core Chips," 2010 15th IEEE European Test Symposium (ETS), May 2010, pp. 30-35.

(Continued)

*Primary Examiner* — Marc Duncan
(74) *Attorney, Agent, or Firm* — Toler Law Group

(57) ABSTRACT

Systems and methods to test processor cores of a multi-core processor microchip are provided. Comparison circuitry may be configured to compare data output from processor cores of a microchip. An encoding module may be configured to encode received data by initially assigning binary bit values to the processor cores. Based on at least one of a number of the processor cores and a first binary bit value, a first additional binary bit may be added to the first binary bit value. The first binary bit value may be assigned to a first processor core of the plurality of processor cores.

19 Claims, 7 Drawing Sheets

(56) References Cited

U.S. PATENT DOCUMENTS

2012/0030524 A1*  2/2012  Schmid et al. .................. 714/49
2013/0232383 A1*  9/2013  Yamada et al. ................. 714/48
2013/0332774 A1* 12/2013  Sinanoglu ...................... 714/32

OTHER PUBLICATIONS

Vasileios Tenentes et al., "Test-Data Volume and Scan-Power Reduction with Low ATE Interface for Multi-Core SoCs," Nov. 2011, IEEE/ACM International Conference on Computer-Aided Design (ICCAD), pp. 747-754.

Disclosed anonymously, "Method for a scalable architecture for multi-core and system-on-chip (SoC) semiconductor design and test," Sep. 21, 2005, IP.com Prior Art Database. IP.com No. IPCOM000128935D.

* cited by examiner

For n>3; 2n-2 bits for 2**n - 1 cores:
- n=4: 4+2 bits – for 15 cores
- n=5: 5+3 bits – for 31 cores
- n=6: 6+4 bits – for 63 cores
- n=7: 7+5 bits – for 127 cores
- n=8: 8+6 bits – for 255 cores
- n=9: 9+7 bits – for 511 cores
- n=10: 10+8 bits – for 1023 cores For n>3; 2n-3 bits for 2**n – (n+1) cores:
- n=4: 4+1 bits – for 10 cores
- n=5: 5+2 bits – for 26 cores
- n=6: 6+3 bits – for 57 cores
- n=7: 7+4 bits – for 120 cores
- n=8: 8+5 bits – for 247 cores
- n=9: 9+6 bits – for 502 cores
- n=10: 10+7 bits – for 1013 cores

FIG. 3

MULTI-CORE PROCESSOR COMPARISON ENCODING

I. FIELD OF THE DISCLOSURE

The present disclosure relates generally to testing semiconductor devices, and more particularly, to testing integrated circuits that include multiple cores.

II. BACKGROUND

Advances in the semiconductor field have enabled multiple processor cores to be included within a single microchip. Each processor core may include an input/output (I/O) pin testing interface for testing and debugging. The incorporation of duplicate processor cores increases the number of I/O pins to be tested, as well as the time required to test the I/O pins. A serial approach of testing each processor core would multiply the test time according to the number of cores. Similarly, providing a test input and a test output for each processor core multiplies the number of required I/O pins. Therefore, the issue arises of how to efficiently test integrated circuits having a plurality of processor cores.

III. SUMMARY OF THE DISCLOSURE

A particular embodiment may include an apparatus having a plurality of processor cores and comparison circuitry configured to compare data output from the plurality of processor cores. An encoding module may be configured to encode received data by initially assigning a plurality of binary bit values to the plurality of processor cores. Based on at least one of a number of the plurality of processor cores and a first binary bit value of the plurality of binary bit values, a first additional binary bit may be added to the first binary bit value. The first binary bit value may be assigned to a first processor core of the plurality of processor cores.

In an embodiment, the apparatus may be a multi-core processor microchip, and the plurality of processor cores may receive test data from an off-microchip tester. The binary bit value may be determined based on the number of the plurality of processor cores. The received data may be compared data that has been output from the comparison circuitry. The encoded output from the encoder module may be received by the off-microchip tester. A masking module may be connected to both the comparison circuitry and the encoding module.

According to another particular embodiment, a method of testing a multi-core processor microchip may include receiving data output from a plurality of processor cores and encoding the data by initially assigning a plurality of binary bit values to the plurality of processor cores. Based on at least one of a number of the plurality of processor cores and a first binary bit value of the plurality of binary bit values, a first additional binary bit may be added to the first binary bit value. The first binary bit value may be assigned to a first processor core of the plurality of processor cores. In an embodiment, a second additional binary bit may be assigned to the first binary bit value of the plurality of binary bit values based on a first bit of the first binary bit value. A comparison operation may be performed on the data output from the processor core prior to the encoding. An operational status of a processor core may be identified as being undeterminable. Another determination may ascertain whether all bits of the first binary bit value have been assigned to the first processor core. A masking operation may mask the data using a sticky fail bit. The masking operation may be performed on the fly. Processes may determine whether a mask has been changed from a previous masking operation.

According to another particular embodiment, a method of testing a multi-core processor microchip may include receiving data output from a plurality of processor cores of a multi-core processor microchip. A comparison operation may be performed on the data at the multi-core processor microchip. Subsequent to the comparison operation, the data may be encoded at the multi-core processor microchip. A masking operation may be performed on the data, and the masking operation may be performed on the fly. A plurality of binary bit values may be initially assigned to the plurality of processor cores and based on at least one of a number of the plurality of processor cores, and a binary bit value may be assigned to a first processor core. The data may initially be received at the plurality of processor cores from an off-microchip tester. In another or the same embodiment, encoded data that has been output from the microchip may be communicated to the off-microchip tester.

An embodiment may improve the efficiency of testing a microchip with a plurality of processor cores. An embodiment of a method may include a comparison of test results that is accomplished on the microchip. Results data from the tester may be supplied via a reused scan input to an XOR for each multi-core processor to allow one set of data to be used for multiple cores. Encoding may reduce the volume of data to be transferred off of the microchip and may allow unique fails to facilitate the detection of all faults.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

FIG. 3 shows tables of test patterns of encoded data and associated formulas associated with encoding processes of an embodiment;

V. DETAILED DESCRIPTION

Figure 1:
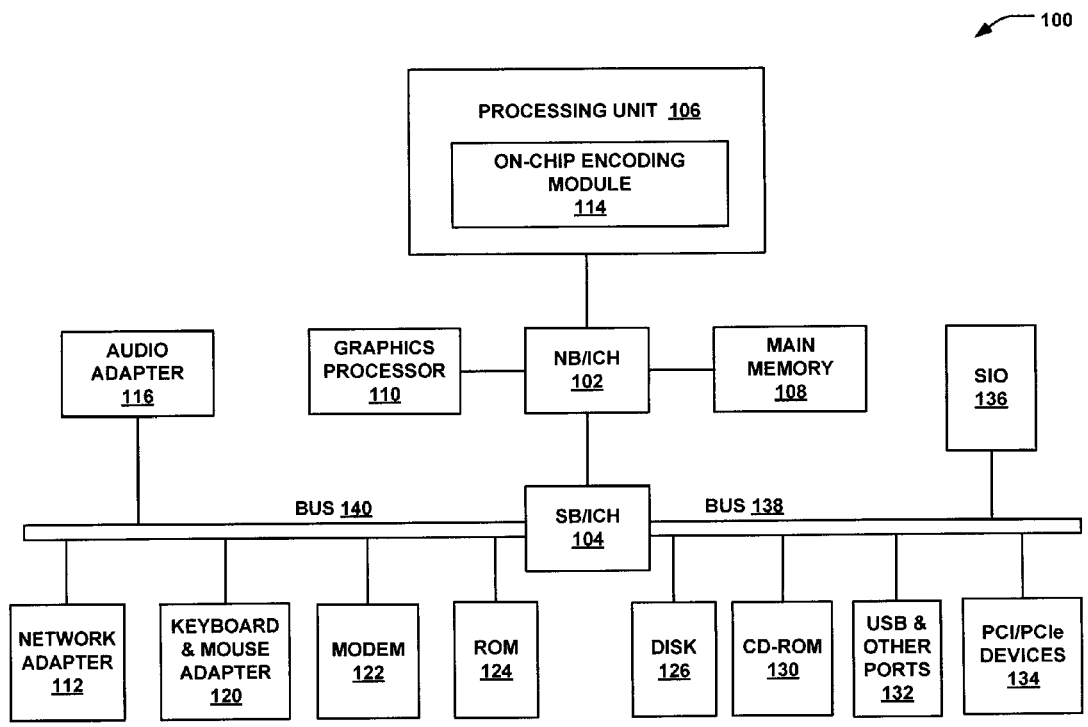
FIG. 1 is a block diagram of a computing system configured to develop and test a microchip system in a manner consistent with an embodiment.

An integrated circuit chip architecture and method are provided that may improve the efficiency of testing an integrated circuit chip with a plurality of circuitry cores. An embodiment may include a method of providing test capability to a multi-core integrated circuit microchip with a comparison of test results done on the microchip. A system performing the method may include an external microchip tester and an on-board testing function. Results data from the tester may be supplied via a reused scan input to an XOR for each multi-core processor to allow one set of data to be used for multiple cores. According to a particular embodiment, a single scan path may be used for each core, and the encoding output may point to a failing single core for each cycle of compared data. A mask may use a sticky fail bit. The mask may be loaded externally, internally, and/or with unique fails to facilitate the detection of all faults. Another embodiment may use multiple scan paths. Varieties of cores may use unique inputs for each type of core. Logic may be added to prioritize cores.

An embodiment of a system may reduce test time, data volume, and test input/output (I/O) by using a common core comparison encoding structure. A results comparison function may be located on the microchip (not at a separate tester) to allow a comparison of results data with more processor cores than a limiting I/O pin count can allow. Results may be compressed from the multiple processor cores and fed out the limited I/O pins to allow failing microchip, processor core, and latch isolation. This encoding scheme may then allow larger microchips (including three-dimensional stacked microchips) with many common processor cores to fit into tester data volume and pin limits. This feature may reduce costs associated with tester upgrades and testing time. An additional masking function may allow diagnostic evaluation of individual failures. An embodiment may use additional logic on the microchip to prioritize processor cores when testing.

According to a particular embodiment, a compare function is located not at a tester, but within the microchip. Results data may be supplied via a reused scan input to an XOR for each processor core. This arrangement may reduce the tester data volume because one set of data may be used for multiple processor cores. In addition to the compare function circuitry, various encoding schemes may be used for the resulting compare data. Rather than creating multiple test modes, multiple processor cores may be analyzed in a single test, resulting in reduced tester time and data volume.

An embodiment of a system may include a single scan path for each processor core, with an encoding output that points to a failing single core for each cycle of data being compared. An embodiment of a method may include using a variation of a Hamming sequence.

Where two or more processor cores fail in a manner that masks identification of processor cores, the encode may indicate a failure. A walk through the mask register may be used to get isolation. Such scenarios may be minimized by using the encoding module to eliminate processor cores that may not form the mixed result. Aliasing may be further minimized by using output bits, accordingly. For example 1,000 processor cores may be covered all together with 17 bits. The 1,000 processor cores could alternatively be covered using two groups with 15+15 bits, or in four groups with 13+13+13+13 bits, depending on I/O pin availability.

Aliasing may be rare with a large volume of results data, such as in automatic test pattern generation (ATPG) testing. Aliasing may be more likely when comparing compressed results data, such as for on-product multiple input signature register (OPMISR) or logic built-in-self-test (LBIST).

Where a failing core(s) is identified, the core may be evaluated for usefulness as a partial good part. Diagnostics may be applied. The mask may be set to allow one of the failing processor cores, and then the test may be rerun. Results data from the failing processor core may be routed to the I/O interface. Alternatively, the results data may be sent to the output of the XOR and routed to a pin (with a 0 being passing location, and a 1 being a failing location). In a particular embodiment, the same XOR compare operation may feed encoding logic with the passing bits showing up as an all 0 encode, and failing bit locations encoding to the processor core value.

Comparing expected data every result cycle may allow the opportunity to detect unique fails for each processor core. The detection may occur while ignoring encodes that point to multiple processor cores. A second pass through test with masks in place for each already identified failing core may run clean. However, the second pass may reveal additional processor cores that were masked by all the processor cores identified in the first pass.

A mask operation of an embodiment may include loading unique fails after all tests and rerunning and repeating until a clean result is achieved. Alternatively, a load may be initiated after each test, and the test may be rerun until a clean result is achieved. A next test may then be initiated. According to another embodiment, a load may be initiated from outside the part, e.g., via a scan operation at the end of the test pattern or suite. A special encoded load may be done at any time (e.g., even during a mid-pattern compare operation).

A mask operation of another particular embodiment may include loading internally on each compare by decoding a unique fail and setting the one mask bit, which may become a sticky fail bit. Externally, the fails may be visible so the test may be rerun until all fails are non-unique or the test result is clean. Setting the mask with the compare (rather than the encode) may potentially result in masking multiple cores in the same cycle, so not isolated externally. The mask may be read to determine the failing cores. Where a number of states should be ignored at certain expected data locations, external monitoring logic may ignore failing encodes at those times. Where internal sticky bits are used, then an ignore signal may be added to cause that cycle of compare to be ignored.

According to another particular embodiment, multiple scan paths per core may be paired up with multiple results data inputs. Multiple styles of common cores may use separate expect inputs for each style of core. The different styles may use separate ignore masking streams, though different cores may share the same test coverage lost. The encoding may still be combined or kept separated. In another or the same embodiment, expect data may be aligned to actual data for all cores, so some latch staging or scan speed reduction might be used.

A binary code (e.g., each pinout being an OR of half the channel compares) or a grey code variation may be used rather than a variation on the Hamming sequence. To counter an aliasing problem, additional logic may be used to prioritize cores. In this manner, decodes may be valid, but lower priority cores may be masked by higher priority cores. Extra tests with known failing cores masked may be used. Sticky bits may be used to enable masking for all further tests once a core fails once. An embodiment of a system may use an encoding scheme for external review, rather than merely using the same compare data to all identical cores from external.

An embodiment of a system may include an on the fly ability to identify individual failing cores. On the fly masking may include updating a mask prior to a subsequent comparing operation or generation of a next pattern. The masking may be added on successive patterns by changing the input command and SDI stream, rather than using on the on the fly updating of masks. The on the fly ability may be in addition to or in the alternative to supplying identical results data to identical cores with each being marked as bad or good with local sticky bits, and a combined match output that indicates one or more fails. In operation, encoding processes described herein may identify what data should be masked on the fly so that the data (associated with a failed processor core) does not interfere with other patterns.

Turning more particularly to the drawings, FIG. 1 generally illustrates a block diagram of a data processing apparatus 100 consistent with an embodiment. The apparatus 100, in specific embodiments, may include a computer, a computer system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc.

The data processing system may include any device configured to process data and may encompass many different types of device/system architectures, device/system configurations, and combinations of device/system architectures and configurations. Typically, a data processing system will include at least one processor and at least one memory provided in hardware, such as on an integrated circuit chip. However, a data processing system may include many processors, memories, and other hardware and/or software elements provided in the same or different computing devices. Furthermore, a data processing system may include communication connections between computing devices, network infrastructure devices, and the like.

The data processing system 100 is an example of a single processor unit based system, with the single processor unit comprising one or more on-chip computational cores, or processors. In this example, the processing unit 106 may constitute a single chip with the other elements being provided by other integrated circuit devices that may be part of a motherboard, multi-layer ceramic package, or the like, to collectively provide a data processing system, computing device or the like. The microchip comprising the processing unit 106 may further include an on-chip encoding module 114 in accordance with the illustrative embodiments, as set forth herein.

In the depicted example, the data processing system 100 employs a hub architecture including a north bridge and a memory controller hub (NB/MCH) 102, in addition to a south bridge and an input/output (I/O) controller hub (SB/ICH) 104. A processing unit 106, a main memory 108, and a graphics processor 110 are connected to the NB/MCH 102. The graphics processor 110 may be connected to the NB/MCH 102 through an accelerated graphics port (AGP).

In the depicted example, a local area network (LAN) adapter 112 connects to the SB/ICH 204. An audio adapter 116, a keyboard and mouse adapter 120, a modem 122, a read only memory (ROM) 124, a hard disk drive (HDD) 126, a CD-ROM drive 130, a universal serial bus (USB) port and other communication ports 132, and PCI/PCIe devices 134 connect to the SB/ICH 104 through bus 138 and bus 140. The PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

An HDD 126 and a CD-ROM drive 130 connect to the SB/ICH 104 through the bus 140. The HDD 126 and the CD-ROM drive 130 may use, for example, an integrated drive electronics (IDE) or serial advanced technology attachment (SATA) interface. A duper I/O (SIO) device 136 may be connected to SB/ICH 104.

An operating system runs on the processing unit 106. The operating system coordinates and provides control of various components within the data processing system 100 in FIG. 1.

As a client, the operating system may be a commercially available operating system. An object-oriented programming system programming system may run in conjunction with the operating system and provide calls to the operating system from programs or applications executing on the data processing system 100. The data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as the HDD 126, and may be loaded into main memory 108 for execution by processing unit 106. The processes for illustrative embodiments may be performed by the processing unit 106 using computer usable program code. The program code may be located in a memory such as, for example, a main memory 108, a ROM 124, or in one or more peripheral devices 126 and 130, for example.

A bus system, such as the bus 138 or the bus 140 as shown in FIG. 1, may be comprised of one or more buses. The bus system may be implemented using any type of communication fabric or architecture that provides for a transfer of data between different components or devices attached to the fabric or architecture. A communication unit, such as the modem 122 or the network adapter 112 of FIG. 1, may include one or more devices used to transmit and receive data. A memory may be, for example, the main memory 108, the ROM 124, or a cache such as found in the NB/MCH 102 in FIG. 1.

Those of ordinary skill in the art will appreciate that the embodiments of FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Further, embodiments of the present disclosure, such as the one or more embodiments may take the form of a computer program product accessible from a computer-usable or computer-readable medium providing program code for use by or in connection with a computer or any instruction execution system. For the purposes of this description, a non-transitory computer-usable or computer-readable medium can be any non-transitory medium that can tangibly embody a computer program and that can contain or store the computer program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD). The processes of the illustrative embodiments may be applied to a multiprocessor data processing system, such as a SMP, without departing from the spirit and scope of the embodiments.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, the data processing system 100 may be a portable computing device that is configured with flash memory to provide non-volatile memory for storing operating system files and/or user-generated data, for example. Essentially, the data processing system 100 may be any known or later developed data processing system without architectural limitation.

Figure 2:
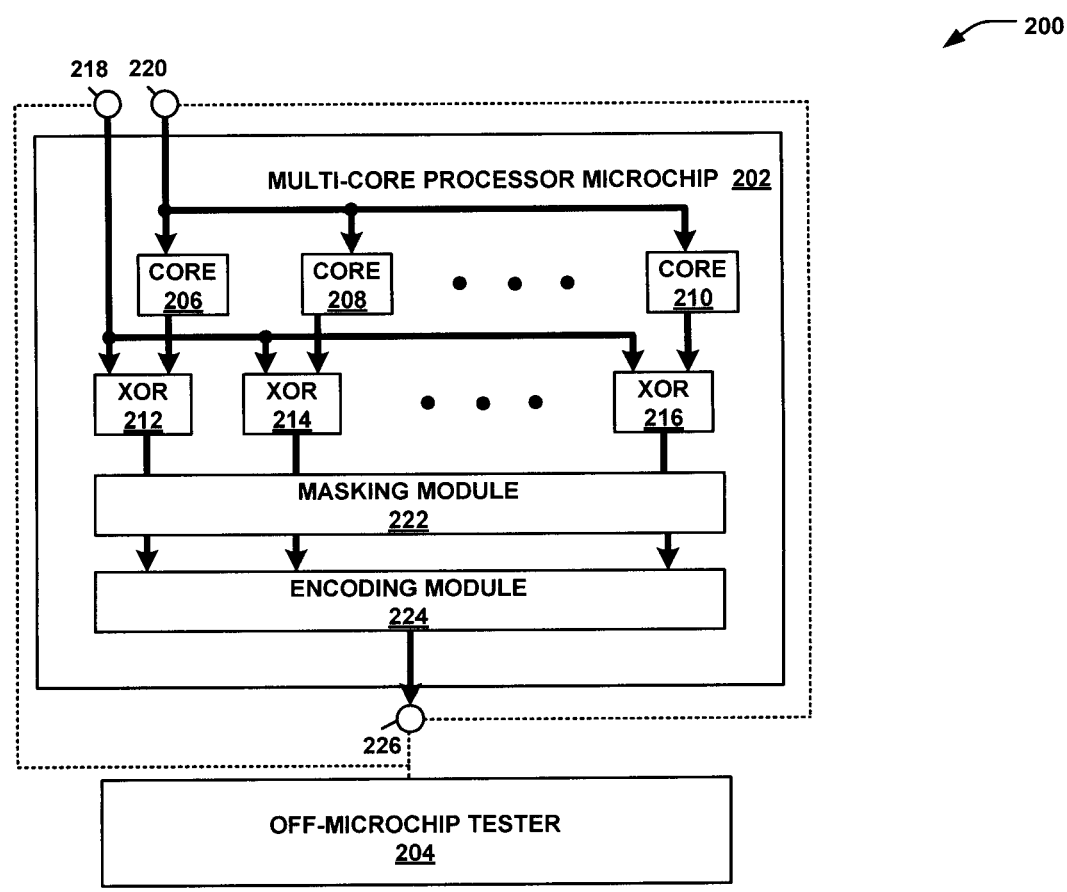
FIG. 2 is a block diagram of a multi-core microchip system according to an embodiment.

FIG. 2 shows an embodiment of a multi-core processor testing system 200, or apparatus, which includes a multi-core processor microchip 202 and an off-microchip tester 204, or automated test equipment. The system 200 may be configured to execute processes to encode compared data on-chip by adding additional bits to a test pattern to efficiently identify a faulty processor core. The microchip 202 may include a plurality of processor cores 206, 208, 210. The microchip 202 may further include comparison circuitry comprising a plurality of XORs 212, 214, 216 that receive inputs from respective processor cores 206, 208, 210. The XORs 212, 214, 216 may each receive first test data from a first test input 218. The first test data may include expected data supplied to the first test input 218 from the off-microchip tester 204. The processor cores 206, 208, 210 may receive second test data from a second test input 220. The compared data from the XORs 212, 214, 216 maybe encoded at an encoding module 224 prior to being provided to an output 226. The compared data may additionally be masked at a masking module 222.

As described herein, the encoding processes may include assigning an initial n-bit binary value to each core. The value of n may be determined based on a total number of cores to be supported. The encoding process may further include adding one or more additional bits to the values associated with each core. For example, a single additional bit, or unique encoding bits, may be assigned a binary 1 value for each core with a single 1 in the first n bits of its unique binary value. A second additional bit, or unique encoding bit d, may be assigned to a binary 1 value for all cores having a value with two 1s in the first n bits. A zero may otherwise be assigned for the first and second additional bits.

The data received at the second test input 220 may include compared, encoded data generated at the test output 226. As such, an embodiment of the system 200 may use the XORs 212, 214, 216 to compare expected data to actual compared and encoded data that has been output by the microchip 202. The off-microchip tester 204 of an embodiment evaluates the comparison data test patterns generated at the test output 226 to ascertain determinable and undeterminable faulty cores. To this end, the off-microchip tester 204 may include a logic analyzer and debug software, as well as memory storage.

Embodiments allow for efficiently testing semiconductor chips with multi-core design. The testing of such multi-core designs may benefit from the fact that the processor cores are substantially similar, meaning that they are usually identical except for a very small fraction of the design. Therefore, tests for one processor core are mostly applicable for all processor cores. This applicability of the same tests for all processor cores of a multi-core chip is utilized by the embodiments to enable an efficient testing of the microchips.

FIG. 3 shows tables 302, 304 of potential test patterns of encoded data and associated formulas 306, 308. The potential test patterns of the tables 302, 304 illustrate how encoding bits may be assigned to accommodate multiple processor cores. For example, the tables 302, 304 include n-bit binary values (e.g., f0-f3) assigned for 15 processor cores (e.g., 0-14). Table 302 shows encoding assignments for an even numbered binary value, and table 304 shows encoding assignments for an odd numbered binary value. The formulas 306, 308 show how the encoding processes of an embodiment may be used for thousands of processor cores. The value of n may be determined based on the total number of cores.

The tables show additional bits (e.g., s and d) that may be additionally assigned to the binary values assigned to each core. The additional bits may make the binary values unique and allow core test results to be more efficiently tested. For instance, a first additional bit, s, may be assigned to a binary 1 value for each core (0-14) having a single 1 in the first n bits (f0-f3) of its unique binary value. A second additional bit, d, may be assigned to a binary 1 value for all cores having a value with two 1s in the first n bits. A zero may otherwise be assigned for the first and second additional bits. While not shown, a third additional bit may be added to a core value having three 1s in the first n bits; a fourth additional bit may be added to a core value having four 1s, and so on.

The table 302 may use six output bits for 15 processor cores. Column 15 in the table 302 may be unused to be an alias of combinations of other processor core fails. Column 15 could be added in, but would use an additional output. A single bit fail may indicate the line out failing and does not decode to a particular processor core. The odd option of table 304 may be less preferable for small numbers of cores, having more decodes alias with other core fails (e.g., five 5 bits may be used for 10 cores). However, the process may be more efficient with large numbers.

Comparing expected data every result cycle may allow the detection of unique fails for each processor core. The detection may occur while ignoring encodes that point to multiple processor cores. A second pass through test with masks in place for each previously identified failing core may run clean. However, the second pass may reveal additional processor cores that were masked by all the processor cores identified in the first pass.

Figure 4:
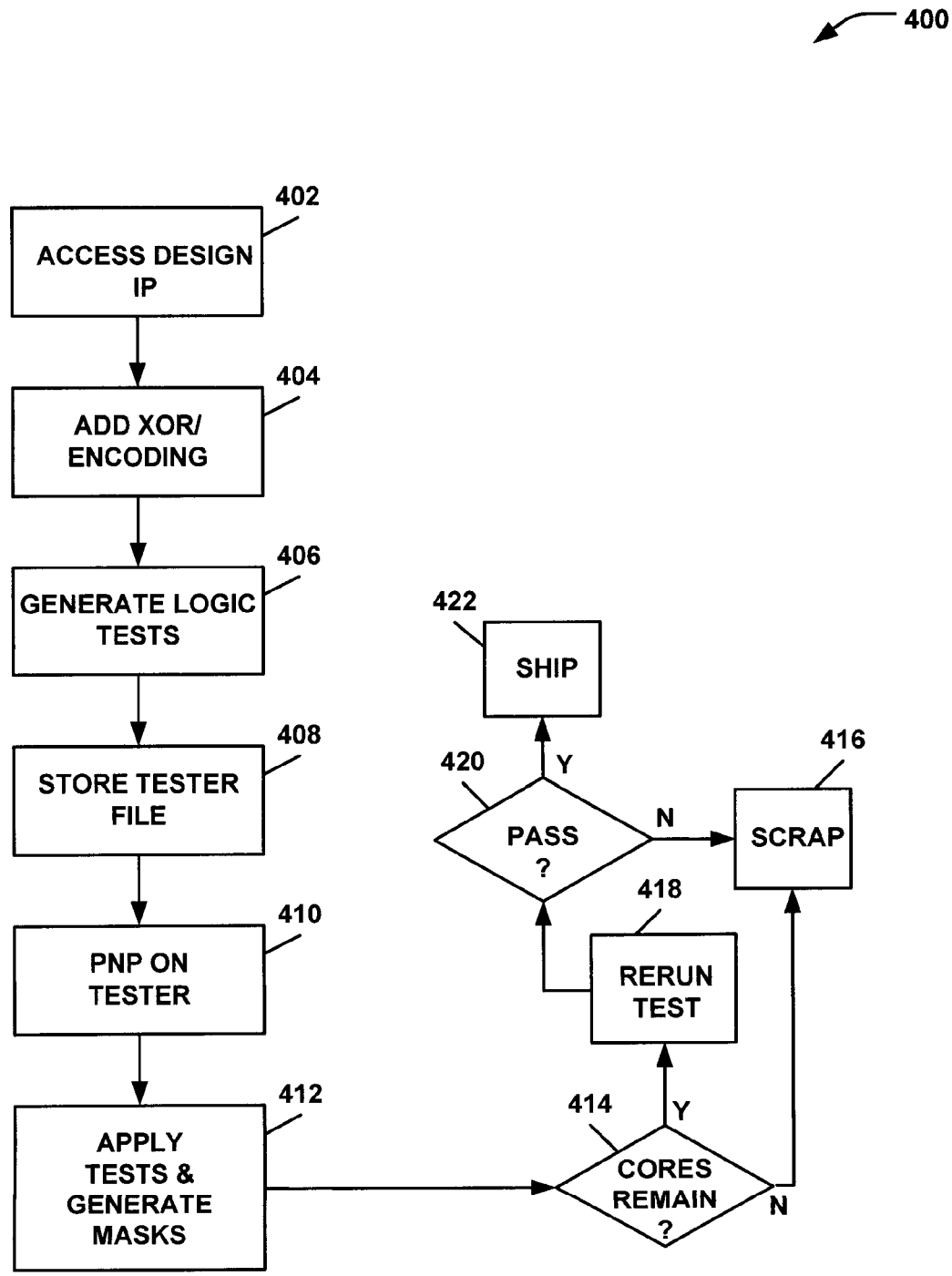
FIG. 4 is a flowchart of an embodiment of a method of testing a multi-core microchip according to an embodiment.

FIG. 4 is a flowchart of an embodiment of a method 400 of testing a multi-core microchip, such as the multi-core microchip of FIG. 2. As discussed herein, the testing may include encoding processes that include encoding compared data on-microchip by adding additional bits to the test pattern to efficiently identify a faulty processor core. At 402 of the flowchart, the microchip design multi-use processor core intellectual property may be retrieved or otherwise accessed. Using the accessed design, XOR and encoding logic may be added to the design at 404. Logic tests may be generated at 406 using the augmented design. Output from the logic test at 406 may be stored at 408 as a tester file. At 410, a part number program (PNP) specific tester for parts may be conducted.

At least one test may be applied, and at least one mask may be generated at 412. The method 400 may determine at 414 if a sufficient number of cores remain. Where there an insufficient amount of cores is determined at 414, then the product may be scrapped at 416. Where a sufficient amount of cores is alternatively present at 414, the full test suite may be rerun with the mask at 418.

Where the rerun test fails to pass at 420, the product may be scrapped at 416. Alternatively, where the test is successful and the product is otherwise determined as being good enough to ship, the microchip may leave the manufacturing facility at 422.

Figure 5:
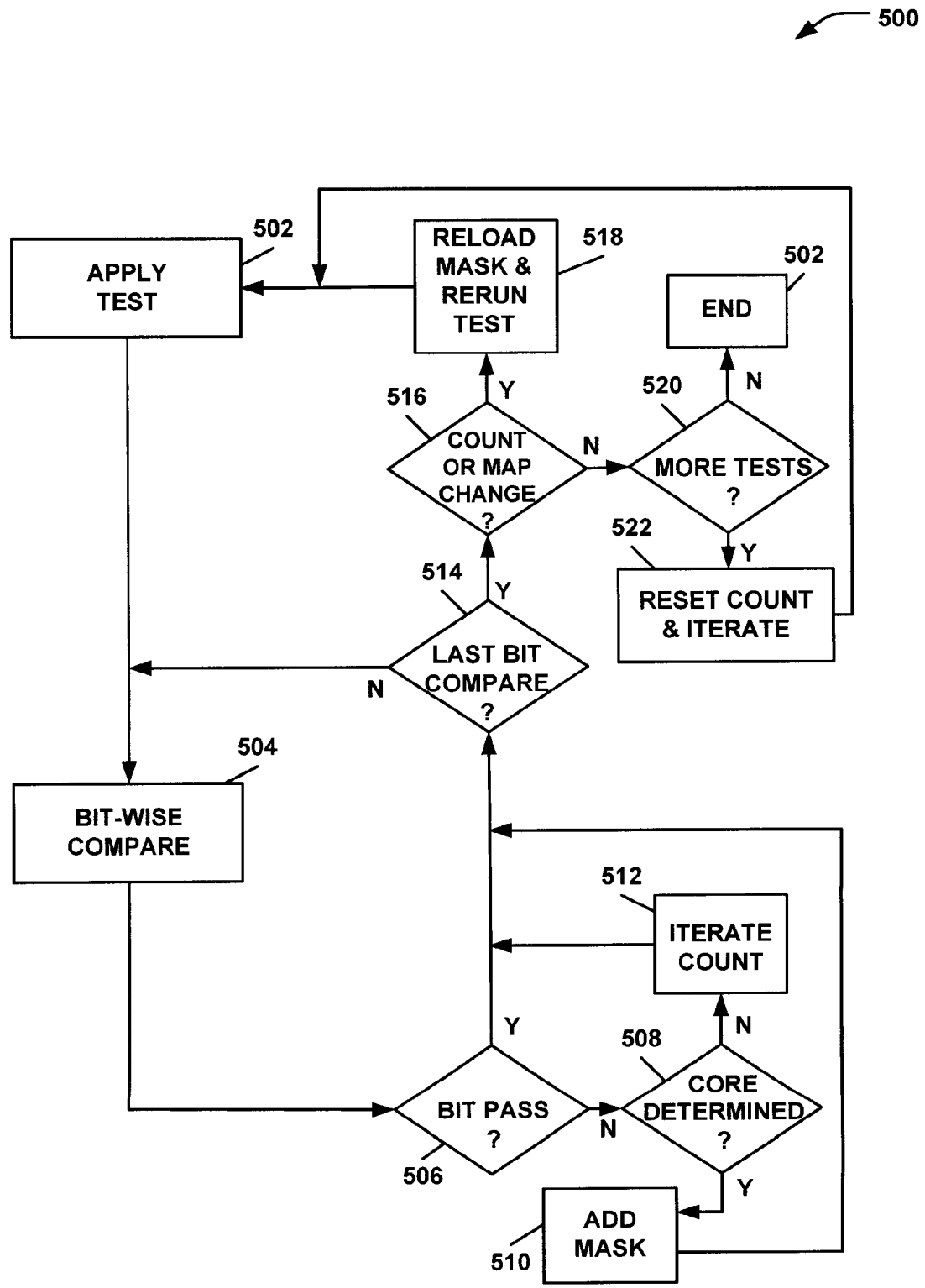
FIG. 5 is a flowchart of an embodiment of a method of applying tests and generating masks, as may have application in the processes of block 412 of the flowchart of FIG. 4.

FIG. 5 is a flowchart of an embodiment of a method 500 of testing a multi-core microchip, such as the multi-core microchip of FIG. 2. The flowchart more particularly shows a method of applying tests and generating masks, as may have application in the processes of block 412 of the flowchart of FIG. 4. As discussed herein, the testing may include encoding processes that include encoding compared data on-microchip by adding additional bits to the test pattern to efficiently identify a faulty processor core.

Turning more particularly to the flowchart, a test may be applied at 502 of the flowchart. A bit-wise comparison may be conducted at 504. Whether the part passes or fails the bit pass test may be determined at 506. Where the part fails to pass the test at 506, the method 500 may determine at 508 if a failed processor core is known. If a failed processor core is determinable at 508, the failing processor core may be masked at 510. Where the failed processor core is alternatively undeterminable at 508, an undetermined count may be iterated at 512. The method 500 may advance to determining at 514 if the last bit has been compared. Where it has not, the method 500 may return to the bit-wise comparison of 504.

Where the undetermined count and/or a mask map are determined to have changed at 516, the method 500 at 518 may reload the updated mask and rerun the same test. Where the undetermined count and/or the mask map are alternatively determined to be unchanged at 516, the method 500 may determine at 520 if any there are any more tests to be performed. Where there are more tests at 520, the undetermined count may be reset at 522 and the method 500 may iterate to the next test.

Figure 6:
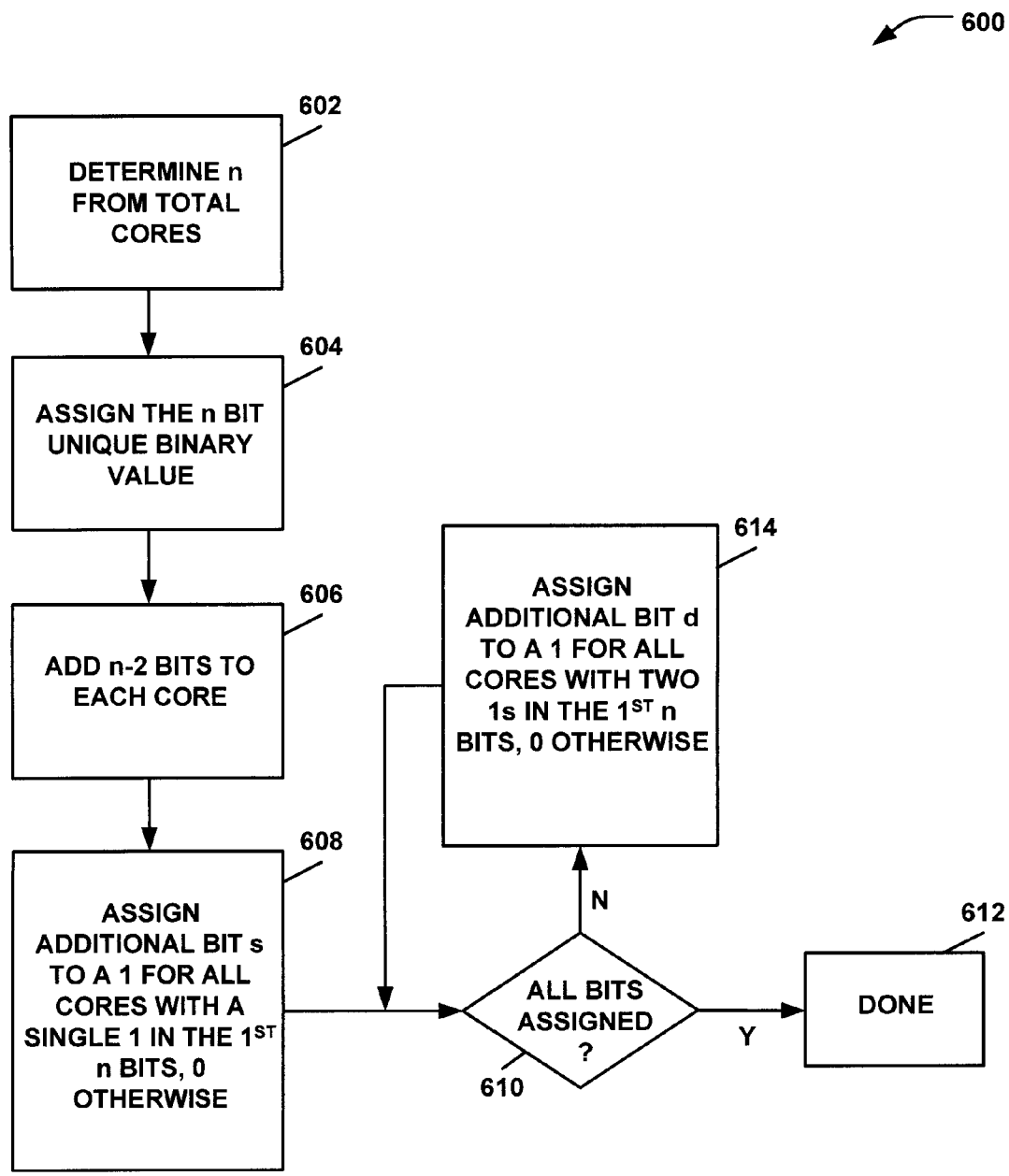
FIG. 6 is a flowchart of an embodiment of a method of encoding data at a multi-core microchip by assigning encoding bits to a test pastern.

FIG. 6 is a flowchart of an embodiment of a method 600 of encoding data of a multi-core microchip, such as the multi-core microchip of FIG. 2. The encoding processes may be used on data that has previously been compared on-microchip. The encoding processes of the method 600 may be used in an embodiment where a numbered, n-bit binary value is even. Turning more particularly to 602 of FIG. 6, a value n, corresponding to the n-bit binary value, may be determined from the total number of cores to support. The determination of an embodiment is calculated according to $2**n-1$. The table 302 of FIG. 3 shows an illustrative embodiment having 15 cores.

At 604, the n-bit unique binary value may be assigned to each processor core of the multi-core processor microchip. For example, the table 302 of FIG. 3 shows an illustrative embodiment having an n-bit binary value of four values (f0-f3). All of the 1s values of the n-bit value may be skipped during the assignment process.

N−2 bits may be added at 606 to the n-bit value assigned to each core. For instance, the table 302 of FIG. 3 shows an illustrative embodiment having additional bits (s and d). At 608, a first additional bit (e.g., s) may be assigned to a 1 for all cores with a single 1 in the first n-bits. A zero may otherwise be assigned at 608.

The method 600 may include determining at 610 if all of the bits of the n-bit value have been assigned. Where all of the bits have been assigned at 610, the method 600 may end at 612. Alternatively, where all of the bits have not been assigned at 610, the method 600 may assign at 614 an additional bit, d, for all processor cores with two 1s in the first n-bits. Otherwise, a 0 bit may be assigned at 614. An embodiment of the method 600 may repeat the determination and processes of 610 and 614 until all the bits have been assigned. One skilled in the art will appreciate that the method of another embodiment may incorporate (e.g., in proximity to 614) the assignment of a third additional bit, t (in addition to s and d), where the third additional bit has been assigned added at 606 and facilitates identification of a faulty processor core.

Figure 7:
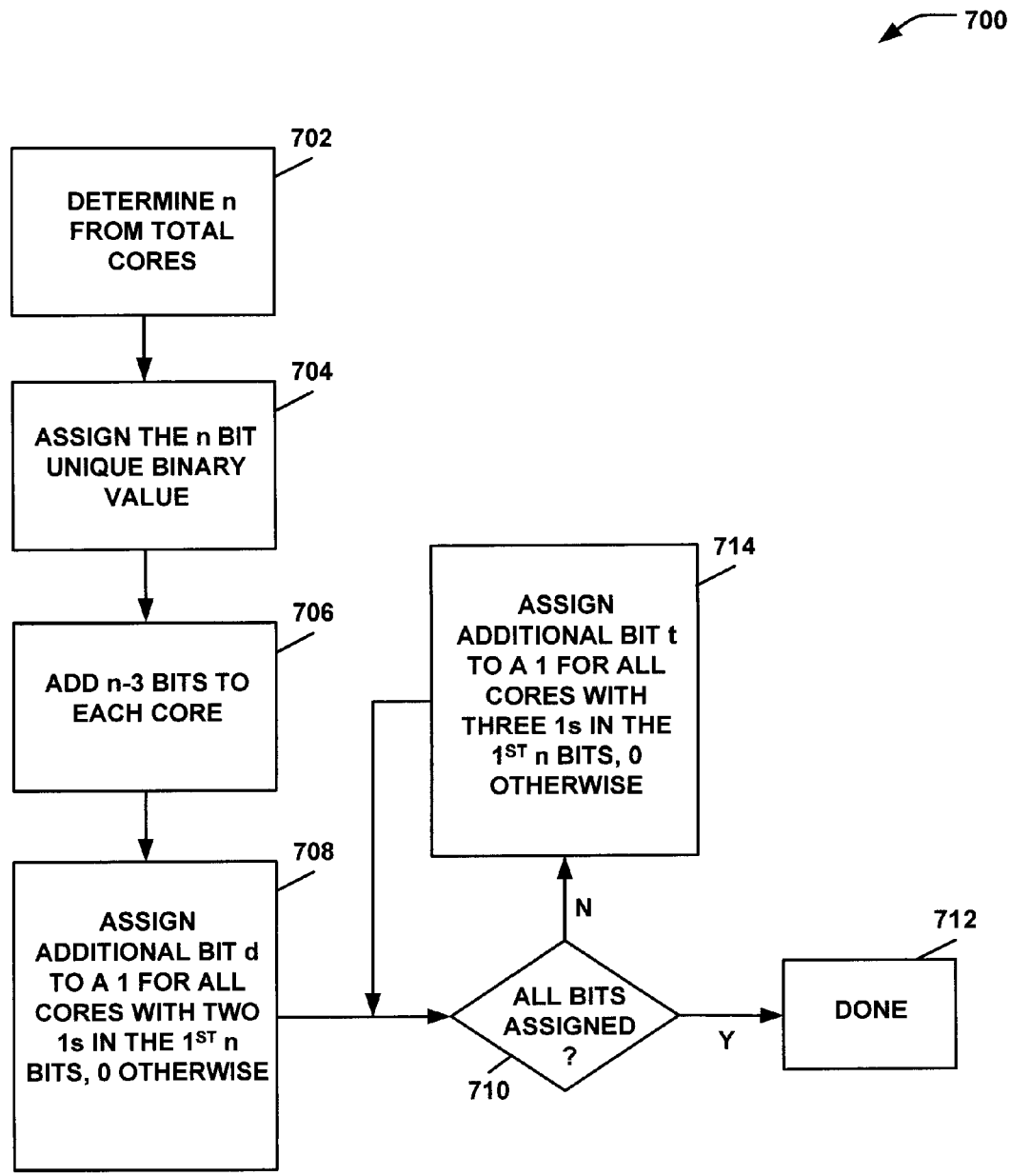
FIG. 7 is a flowchart of a method of encoding data at a multi-core microchip according to another embodiment.

FIG. 7 is a flowchart of another embodiment of a method 700 of encoding data of a multi-core microchip, such as the multi-core microchip of FIG. 2. The encoding processes may be used on data that has been previously compared at the multi-core microchip. The encoding processes of the method 700 may be used in an embodiment where a total number of cores to support is odd. Turning more particularly to 702 of FIG. 7, a value n, corresponding to a numbered, n-bit binary value, may be determined from the total number of processor cores to support. The determination of an embodiment is calculated according to $2**n-(n+1)$.

At 704, the n-bit unique binary value may be assigned to each processor core of the multi-core processor microchip. For example, the table 302 of FIG. 3 shows an illustrative embodiment having an n-bit binary value of four values (f0-f3). All of the assigned 1s values, the assigned 0 values, and any of value having only a single 1 may be skipped during the assignment process.

N−3 bits may be added at 706 to the n-bit value assigned to each core. For instance, the table 304 of FIG. 3 shows an illustrative embodiment having an additional bit(s) (e.g., d, t, and q). At 708, a first additional bit may be assigned to a 1 for all cores with two 1s in the first n-bits. A zero may otherwise be assigned at 708.

The method 700 may include determining at 710 if all of the bits of the n-bit value have been assigned. Where all of the bits have been assigned at 710, the method 700 may end at 712. Alternatively, where all of the bits have not been assigned at 710, the method 700 may assign at 714 an additional bit, t, for all processor cores with three 1s in the first n-bits. Otherwise, a 0 bit may be assigned at 714. An embodiment of the method 700 may repeat the determination and processes of 710 and 714 until all bits have been assigned. As above, the method of another embodiment may incorporate (e.g., in proximity to 714) the assignment of a third additional bit, q (in addition to d and t), where the third additional bit has been assigned added at 706 and facilitates identification of a faulty processor core.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories that provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An apparatus comprising:
   a plurality of processor cores;
   comparison circuitry configured to compare data output from the plurality of processor cores; and
   an encoding module configured to encode received data by initially assigning a plurality of binary bit values to the plurality of processor cores, wherein each binary bit value of the plurality of binary bit values is assigned to a single, corresponding processor core of the plurality of processor cores, and based on at least one of a number of the plurality of processor cores and a first binary bit value of the plurality of binary bit values, adding a first additional binary bit to the first binary bit value, wherein the first binary bit value is assigned to a first processor core of the plurality of processor cores.

2. The apparatus of claim 1, wherein the apparatus is a multi-core processor microchip.

3. The apparatus of claim 1, wherein each processor core of the plurality of processor cores receives test data from an off-microchip tester.

4. The apparatus of claim 1, wherein each binary bit value of the plurality of binary bit values is determined based on the number of the plurality of processor cores.

5. The apparatus of claim 1, wherein the received data is compared data output from the comparison circuitry.

6. The apparatus of claim 1, wherein encoded output from the encoder module is received by an off-microchip tester.

7. The apparatus of claim 1, further comprising a masking module connected to both the comparison circuitry and the encoding module.

8. A method of testing a multi-core processor microchip, the method comprising:
   receiving data output from a plurality of processor cores; and
   encoding the data by:
      initially assigning a plurality of binary bit values to the plurality of processor cores, wherein each binary bit value of the plurality of binary bit values is assigned to a single, corresponding processor core of the plurality of processor cores; and
      based on at least one of a number of the plurality of processor cores and a first binary bit value of the plurality of binary bit values, adding a first additional binary bit to the first binary bit value, wherein the first binary bit value is assigned to a first processor core of the plurality of processor cores.

9. The method of claim 8, further comprising assigning a second additional binary bit to the first binary bit value of the plurality of binary bit values based on a first bit of the first binary bit value.

10. The method of claim 8, further comprising performing a comparison operation on the data output from the processor core prior to the encoding.

11. The method of claim 8, further comprising determining that an operational status of a processor core is undeterminable.

12. The method of claim 8, further comprising determining whether all bits of the first binary bit value have been assigned to the first processor core.

13. The method of claim 8, further comprising masking the data using a sticky fail bit.

14. The method of claim 8, further comprising performing a masking operation on the data, wherein the masking operation is performed on the fly.

15. The method of claim 8, further comprising determining whether a mask has been changed from a previous masking operation.

16. A method of testing a multi-core processor microchip, the method comprising:
   receiving data output from a plurality of processor cores of a multi-core processor microchip;
   performing a comparison operation on the data at the multi-core processor microchip; and
   subsequent to the comparison operation, encoding the data at the multi-core processor microchip, wherein encoding the data comprises:
      assigning a plurality of binary bit values to the plurality of processor cores, wherein each binary bit value of the plurality of binary bit values is assigned to a single, corresponding processor core of the plurality of processor cores; and
      based on at least one of a number of the plurality of processor cores and a first binary bit value assigned to a first processor core, adding a first additional binary bit to the first binary bit value.

17. The method of claim 16, further comprising performing a masking operation on the data, wherein the masking operation is performed on the fly.

18. The method of claim 16, wherein each processor core of the plurality of processor cores receives test data from an off-microchip tester.

19. The method of claim 16, further comprising outputting encoded data from the multi-core processor microchip to an off-microchip tester.

* * * * *